(12) United States Patent
Okuhara et al.

(10) Patent No.: US 6,311,835 B1
(45) Date of Patent: Nov. 6, 2001

(54) APPARATUS FOR HOLDING A COMPACT DISK

(75) Inventors: Atsusi Okuhara; Hideo Ohashi; Susumu Hiramatsu, all of Nagano (JP)

(73) Assignee: Kinyosha Printing Co., Ltd., Tokyo (JP)

( * ) Notice: Subject to any disclaimer, the term of this patent is extended or adjusted under 35 U.S.C. 154(b) by 0 days.

(21) Appl. No.: 09/549,546

(22) Filed: Apr. 14, 2000

(30) Foreign Application Priority Data

Apr. 16, 1999 (JP) .................................................. 11-109937
Feb. 15, 2000 (JP) .................................................. 12-036076
Apr. 6, 2000 (JP) .................................................. 12-104545

(51) Int. Cl.[7] .................................................. B65D 85/57
(52) U.S. Cl. .................................................. 206/308.1; 206/310
(58) Field of Search .................................. 206/307, 308.1, 206/309, 310, 493

(56) References Cited

U.S. PATENT DOCUMENTS

| 5,251,750 | 10/1993 | Gelardi et al. . |
| 5,526,926 | 6/1996 | Deja . |
| 5,685,425 | 11/1997 | Choi . |
| 5,685,427 | * 11/1997 | Kuitems et al. ..................... 206/310 |
| 5,788,068 | 8/1998 | Fraser et al. . |
| 5,829,582 | * 11/1998 | Ippolito et al. ................... 206/308.1 |
| 5,896,986 | * 4/1999 | Bolognia et al. .................... 206/310 |
| 5,960,949 | * 10/1999 | Wynalda, Jr. ....................... 206/310 |
| 6,041,923 | * 3/2000 | Furutsu ............................. 206/308.1 |

FOREIGN PATENT DOCUMENTS

| 37 15 187 | 11/1988 | (DE) . |
| 0 356 539 | 3/1990 | (EP) . |
| 0 429 195 | 5/1991 | (EP) . |
| 2 291 640 | 1/1996 | (GB) . |
| WO 97/41563 | 11/1997 | (WO) . |

* cited by examiner

Primary Examiner—Luan K. Bui
(74) Attorney, Agent, or Firm—Armstrong, Westerman, Hattori, McLeland & Naughton, LLP (57) ABSTRACT

The present invention provides an apparatus for holding a compact disk, composed of a cylindrical body around which the central hole of the compact disk is fit and disk-receiving member, forming a plurality of tongue-shaped members extending between cut openings from the cylindrical body to the disk-receiving member, each with a nail-shaped member at the front end, wherein the nail-shaped members at the end of the tongue-shaped members rise to lift the compact disk when the cylindrical body is pushed downward.

6 Claims, 12 Drawing Sheets

APPARATUS FOR HOLDING A COMPACT DISK

BACKGROUND OF THE INVENTION

1. Field of the Invention

This invention relates to apparatus for holding a compact disk, more particularly an apparatus which allows the disk it holds to be easily released from the compact disk tray or case by a push-button type release.

2. Description of the Prior Art

In general, a compact disk tray, set in a case for holding a compact disk which carries music, images, data for computer or the like, is equipped with a disk-holding device for holding the compact disk, comprising an essentially cylindrical disk holding member, upper portion of which is bent inward to form a circular space.

Figure 10:
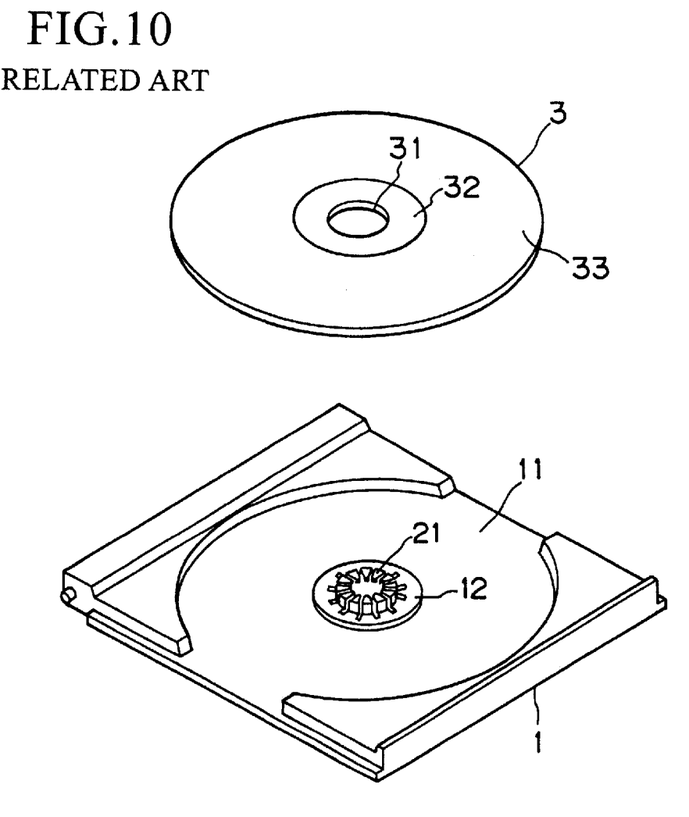
FIG. 10 is an oblique view of a conventional compact disk tray and compact disk.

Referring to FIG. 10, for example, a tray 1 to be set in a compact disk receptacle is made of synthetic resin formed into an essentially flat plate, with a cylindrical base member 11 at the center, in which a compact disk 3 is fit loosely.

A circular disk-receiving member 12 is formed at the center of the base member 11 and disk-holding member 21 is formed at the center of the disk-receiving member 12, the former projecting upward from the base member 11 to come into contact with a ring-shaped member 32 around the central hole 31 of the compact disk 3, where no signal is recorded in the member 32, and the latter being inserted into the central hole 31 to hold the compact disk 3.

Figure 11:
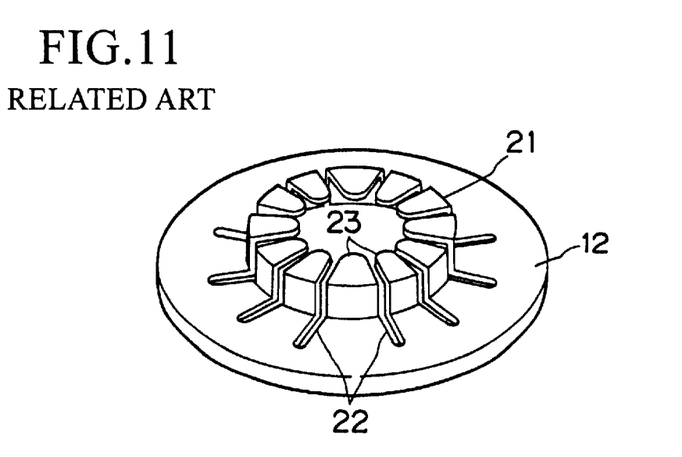
FIG. 11 shows a detailed disk-holding member of a conventional tray.

The periphery of the base member 11 is ripped at the sections corresponding to both sides, allowing the compact disk set in the tray to be nipped by two fingers. FIG. 11 shows the disk-receiving member 12 and disk-holding member 21 in more detail. The circular disk-receiving member 12 is formed to slightly rise on the base member 11. The disk-holding member 21 is located at the center of the disk-receiving member 12, and has openings 22 oriented in the radial direction, and nail-shaped pieces 23, which are separated from each other by the openings 22 and stand essentially upright on the way on the disk-receiving member 12, with each upper portion bent towards the center of the disk-receiving member 12, to form an essentially cylindrical body as a whole, whose diameter corresponds to that of the central hole 31 of the compact disk.

The portion of each nail-shaped piece 23 standing essentially upright on the disk-receiving member 12 is slanted slightly outward, as shown in FIG. 11, with the result that the cylindrical body formed by the nail-shaped pieces 23 has a slightly larger diameter than the central hole 31 of the compact disk.

The compact disk 3 is set in the tray 1 by pressing the central hole 31 into the disk-holding member 21 until it comes into contact with the disk-receiving member 12.

Figure 12:
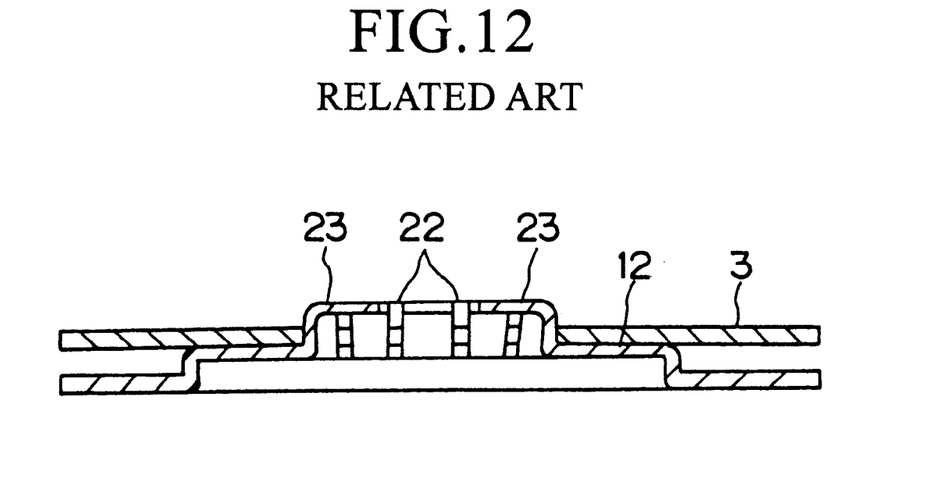
FIG. 12 is a cross-sectional view of a conventional tray holding a compact disk.

In this case, each nail-shaped piece 23 is pressed to the central hole 31 of the compact disk 3, as shown in FIG. 12, and elastically deformed. However, it returns back to the original state, when the elastic deformation by the central hole 31 is released as the compact disk 3 comes into contact with the disk-holding member 12. Each nail-shaped piece 23, being slightly slanted outward, presses the compact disk 3 to the disk-receiving member 12, securely holding the compact disk 3 in the tray body 1.

In this case, the compact disk 3 comes into contact with the tray 1 at its member 32, where no signal is recorded, with the member 33 to record signals kept apart and protected from the tray 1.

Figure 13:
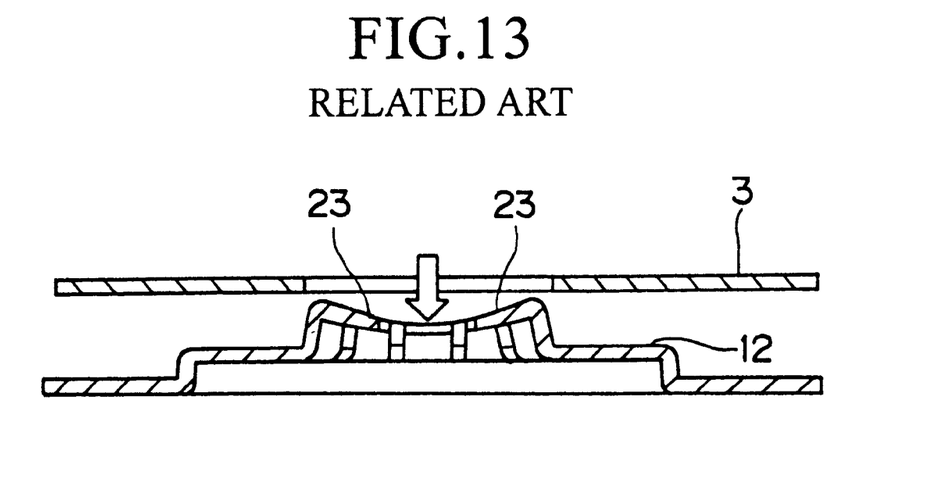
FIG. 13 is a cross-sectional view of a conventional tray, describing procedure of releasing the compact disk it holds.

When the compact disk 3 is released from the tray 1, a fingertip is pressed to the inward bent end of each nail-shaped piece 23 to elastically deform it inward in such a way to release the compact disk 3 from the outward slanted nail-shaped pieces 23, and, at the same time, by lifting the disk 3, as shown in FIG. 13.

Figure 14:
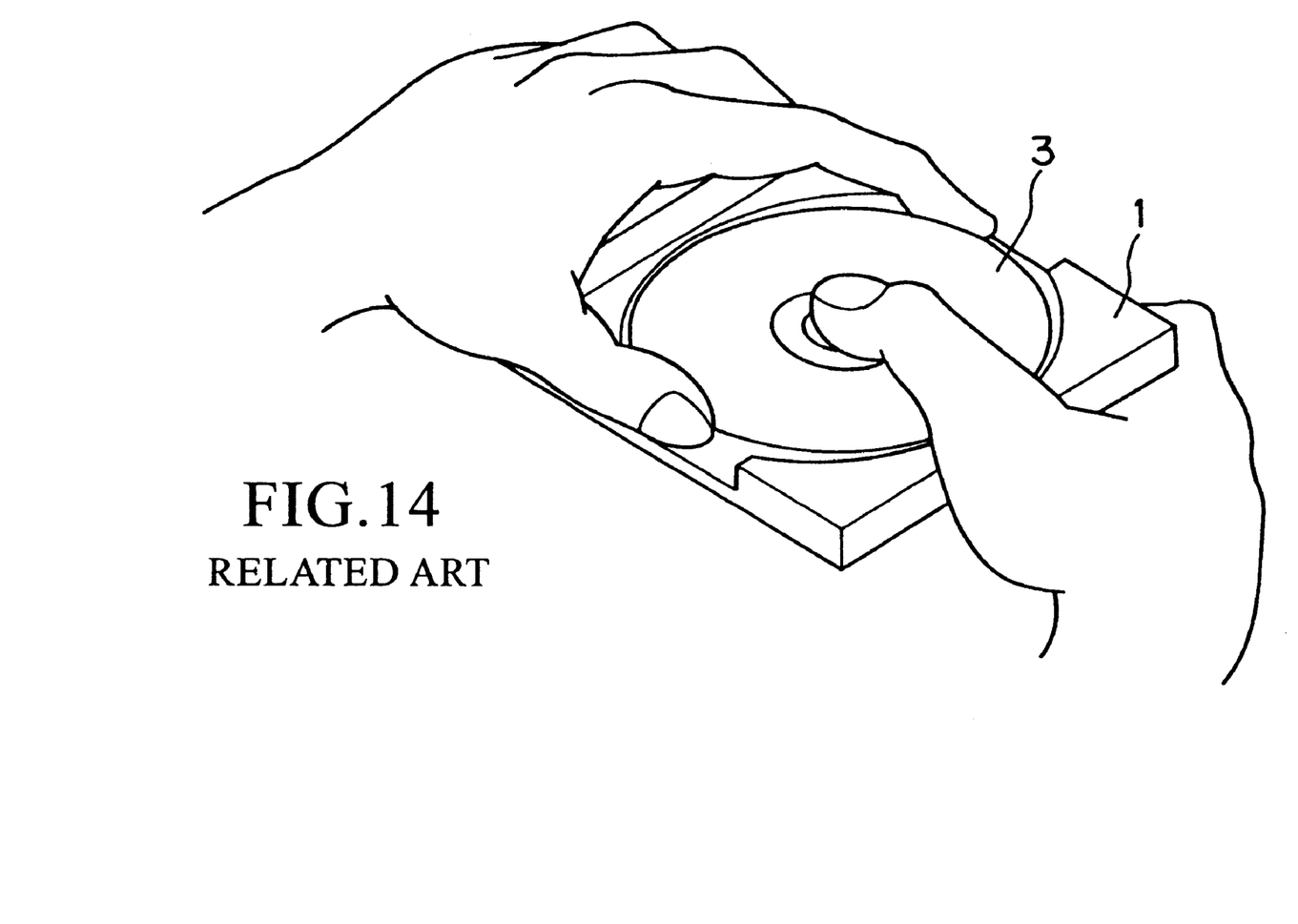
FIG. 14 is an oblique view, describing the problems involved in the disk releasing procedure for a conventional tray.

As described above, when the compact disk 3 is released from the tray body 1 of the conventional disk tray, it is necessary to lift the compact disk 3 while a finger tip is kept pressed to the inward bent end of each nail-shaped piece 23. This needs both hands, as shown in FIG. 14, because the compact disk 3 must be picked up with the thumb and forefinger of, e.g., the left hand while each nail-shaped piece 23 is kept pressed by the thumb of the right hand, and hence is inconvenient.

Another problem involved in the above compact disk tray is insufficient space between the tray and compact disk, because the compact disk itself is not released from the tray while each nail-shaped member is pressed by a finger at the center, making it inconvenient for the finger to press to or let go of the nail-shaped member. The common compact disk, approximately 12 cm in diameter, cannot be easily handled by a person of smaller hand (child or women) or handicapped person. Japanese Laid-open Patent Application No. 10-329881 discloses a cone-shaped disk releasing device, to be set in the circular space in the disk holding cylinder of the disk-holding member, to solve the above problems. This releasing device is composed of a push member and leg set in a division groove in the disk holding cylinder, the latter forcing up the compact disk by leverage when the former is pushed. This device, however, is provided as an optional accessory, and may not be used depending on the design of the holding member in the compact disk tray. It is supplied separately, and attached to the disk holding case.

More recently, the so-called jewel case, in which the holding case and compact disk tray are formed into a monolithic structure, has been developed, and a device which allows the compact disk to be released from the case more easily is in demand.

SUMMARY OF THE INVENTION

It is an object of the present invention to provide an apparatus for holding a compact disk, structured to be easily released by one hand from the compact disk tray or thin jewel case in which it has been held, handled more easily, monolithically moldable and hence excellent in mass-producibility, advantageous costwise because it needs no additional part base, and producible at improved productivity and lower cost.

The inventors of the present invention have developed, after having extensively studied to solve the above problems, an apparatus for holding a compact disk which allows the compact disk it holds to be released easily by one hand and is moldable into the monolithic structure by introducing a cylindrical body around which the disk is fit to be held by the apparatus, where the cylindrical body can work on the principle of rotation or leverage and is provided with elastic force, reaching the present invention.

More concretely, the apparatus of the present invention for holding a compact disk is composed of a cylindrical body around which the central hole of the compact disk is fit and disk-receiving member, forming a plurality of tongue-shaped members extending between cut openings from the cylindrical body to the disk-receiving member, each with a nail-shaped member at the front end, where the nails-shaped members at the end of the tongue-shaped members rise to lift the compact disk when the cylindrical body is pushed downward.

One embodiment of the apparatus of the present invention for holding a compact disk is characterized in that the nail-shaped members at the front ends of the tongue-shaped members rise by the principle of leverage to lift the compact disk.

Another embodiment of the apparatus of the present invention for holding a compact disk is characterized in that the nail-shaped members move on the cylindrical body periphery as the axis, around which the central hole of the compact disk is fit, to lift the compact disk.

Still another embodiment of the apparatus of the present invention for holding a compact disk is characterized in that a plurality of tongue-shaped members extending between cut openings from the cylindrical body, around which the central hole of the compact disk is fit, to the disk-receiving member, each with a nail-shaped member at the front end, where some of the tongue-shaped members rise by the principle of leverage and others move on the cylindrical body periphery as the axis, to lift the compact disk.

Still another embodiment of the apparatus of the present invention for holding a compact disk is characterized in that the cylindrical body, around which the central hole of the compact disk is fit, has an essentially circular hole at the center of the upper face, a plurality of tongue-shaped members extending between cut openings from the cylindrical body to the disk-receiving member, each with a nail-shaped member at the front end, and cantilever arm in the essentially circular hole on the upper face of the cylindrical body, moving by a rotational force and projecting in the direction of the tongue-shaped member extension, where some of the tongue-shaped members rise by the principle of leverage and other tongue-shaped members move on the cylindrical body periphery as the axis, to lift the compact disk.

Still another embodiment of the apparatus of the present invention for holding a compact disk is characterized in that the cylindrical body, around which the central hole of the compact disk is fit, in the disk-holding member at the center of the compact disk tray is composed of two semi-cylindrical bodies forming the cylindrical body having a circular hole at the center of the upper face, each of these semi-cylindrical bodies forming a tongue-shaped member extending between cut openings from the cylindrical body to the disk-receiving member, with a nail-shaped member at the front end, and the nail-shaped member rising and functioning to lift the compact disk when the cylindrical body is pushed downward.

BRIEF DESCRIPTION OF DRAWINGS

FIGS. 3($a$) to 3($c$) represent the cross-sectional views of the III—III section of the apparatus shown in FIG. 2, describing the mechanism of setting and releasing the compact disc;

FIGS. 6($a$) to 6($c$) represent the cross-sectional views of the VI—VI section of the apparatus shown in FIG. 5, describing the mechanism of setting and releasing the compact disc;

FIGS. 9($a$) to 9($c$) represent the cross-sectional views of the IX—IX section of the apparatus shown in FIG. 5, describing the mechanism of setting and releasing the compact disc;

DETAILED DESCRIPTION OF THE PRESENT INVENTION

The present invention is described in detail, below.

The apparatus of the present invention for holding a compact disk is positioned at the center of a compact disk tray set in a compact disk holding case, or can be directly set in a jewel case with a compact disk holding case and tray molded into a monolithic structure, and is composed of a cylindrical body around which the central hole of the compact disk is fit and disk-receiving member.

The circular disk-receiving member is formed to slightly rise from the tray or jewel case base to come into contact with a compact disk member which records no signal but be kept apart from the signal-recording member. The cylindrical body around which the central hole of the compact disk is fit is positioned at the center of the disk-receiving member surface and rises essentially upright therefrom. A plurality of tongue-shaped members extend between cut openings from the cylindrical body to the disk-receiving member, each with a nail-shaped member at the front end. The tongue-shaped members rise when the cylindrical body is pushed downward, which contracts the upper face periphery of the cylindrical body by elastic deformation, to release and lift the compact disk.

The upper face of the cylindrical body preferably has an essentially circular hole, essentially circular hole which is cut or the like, to help it contract elastically, when pushed downward.

For the tongue-shaped member extending between cut openings from the cylindrical body to the disk-receiving member, each with a nail-shaped member at the front end, there are two types, and one or both types may be used for the present invention.

(1) One type of the tongue-shaped member has a member bending from the cylindrical body down to the lower side of the disk-receiving member, which comes into contact with the base of the tray or the like, when the upper face of the cylindrical body is pushed downward, to lift the nail-shaped member at the front end by the principle of leverage.

(2) The other type of the tongue-shaped member, although extending from the cylindrical body to the disk-receiving member, is connected to the adjacent wall as part of the cylindrical body periphery via a support axis 124, moving on as the axis, when the upper face of the cylindrical body is pushed downward, to lift the nail-shaped member at the front end.

The function (1) above is suited for handling the compact disk set in the apparatus of the present invention with the base or the like which can serve as a fulcrum for the leverage, whereas the function (2) above is particularly suited for handling the compact disk set in a jewel case or the like being held by a hand.

As described above, the apparatus of the present invention for holding a compact disk is composed of a cylindrical body around which the central hole of the compact disk is fit and disk-receiving member, forming a plurality of tongue-shaped members extending between cut openings from the cylindrical body to the disk-receiving member, each with a nail-shaped member at the front end. When the upper face of the cylindrical body is pushed downward, (1) the upper face of the cylindrical body is elastically deformed to contract in periphery, releasing the compact disk from the constraint, and, at the same time, each nail-shaped member at the front end of the tongue-shaped member rises by the principle of leverage to lift the compact disk, (2) the upper face of the cylindrical body is elastically deformed to contract in periphery, releasing the compact disk from the constraint, and, at the same time, each nail-shaped member moves on said cylindrical body periphery as the axis, to lift the compact disk, or (3) the upper face of the cylindrical body is elastically deformed to contract in periphery, releasing the compact disk from the constraint, and, at the same time, some of the nail-shaped members rise by the principle of leverage and others move on said cylindrical body periphery as the axis, to lift the compact disk.

It is preferable, for the apparatus provided with the tongue-shaped members whose nail-shaped members at the ends move on said cylindrical body as the axis, to have a cantilever arm projecting over the cylindrical body in the direction of the tongue-shaped member extension, in order to allow the nail-shaped members to exhibit their function more efficiently.

EXAMPLES

The present invention is described in more detail by referring to the concrete shapes of the apparatus for holding a compact disk.

Example 1

Figure 1:
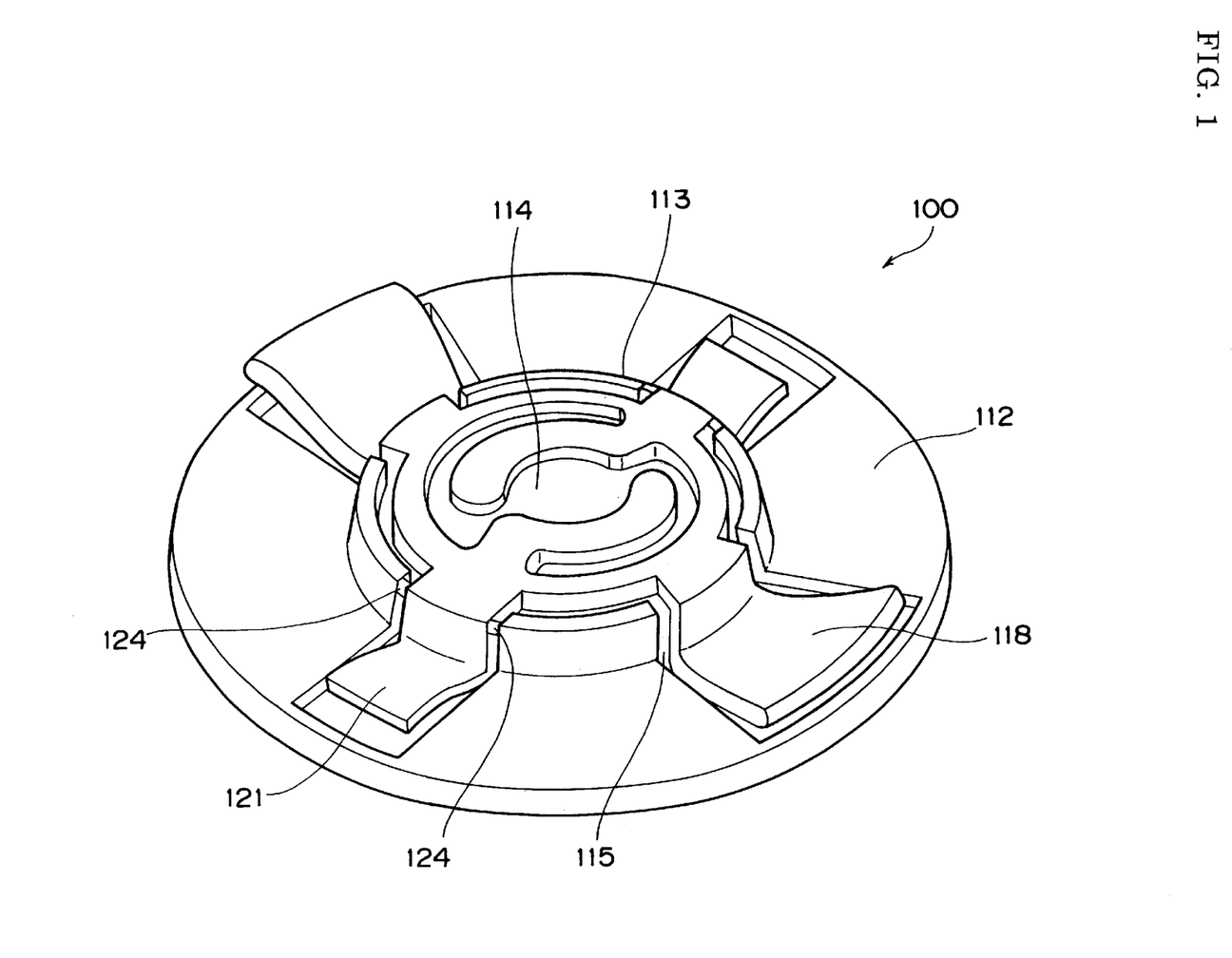
FIG. 1 is an view of one embodiment of the apparatus of the present invention for holding a compact disk.
Figure 2:
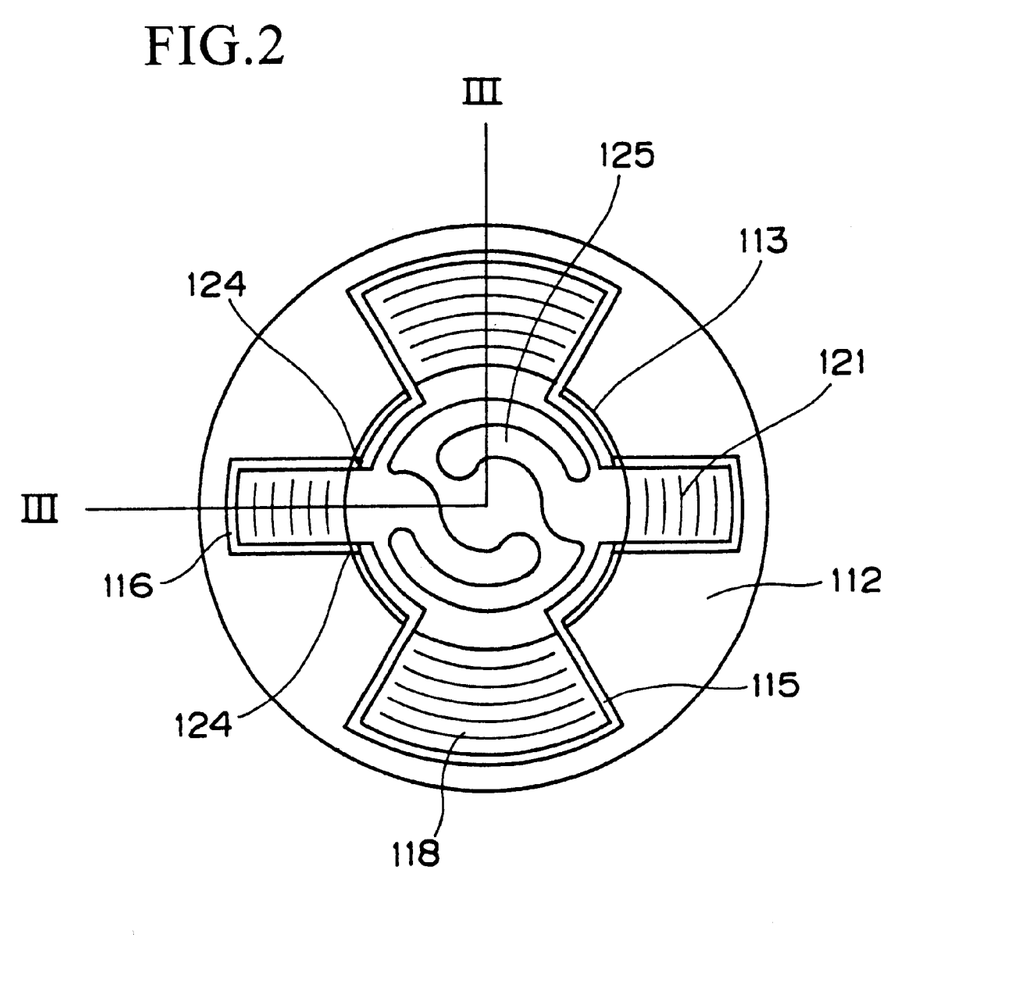
FIG. 2 is the plan view of the apparatus shown in FIG. 1.

FIG. 1 is an oblique view of the apparatus of the present invention for holding a compact disk, composed of a cylindrical body around which the central hole of the compact disk is fit, and disk-receiving member. FIG. 2 is the plan view of the apparatus shown in FIG. 1, and FIG. 3 presents the cross-sectional views of the III—III section of the apparatus shown in FIG. 2, where (a) the cross-sectional view with the compact disk not set, (b) the one with the compact disk set, and (c) the one for describing the mechanism of releasing the compact disk.

Referring to FIG. 1, the apparatus 100 for holding a compact disk has a disk-receiving member 112 and cylindrical body 113, around which the central hole 31 of the compact disk is fit, at the center of the disk-receiving member 112, the cylindrical body 113 having an essentially circular hole 114 at the center of its upper face, and standing essentially upright from the face of the disk-receiving member 112, where the upper face of the cylindrical body 113 has a slightly larger diameter than the central hole 31 of the compact disk.

The upper face of the cylindrical body 113 is provided with an essentially circular hole or the like, to help reduce diameter of the upper face when it is pushed downward. The apparatus is also provided with a plurality of tongue-shaped members 118 and 121 extending between cut openings 115 and 116 from the cylindrical body 113 to the disk-receiving member 112, each tongue-shaped member 118 or 121 having a nail-shaped member 119 or 122 at the front end. The tongue-shaped member 121 is connected to the adjacent wall as part of the cylindrical body periphery via a support axis 124.

Figure 3A:
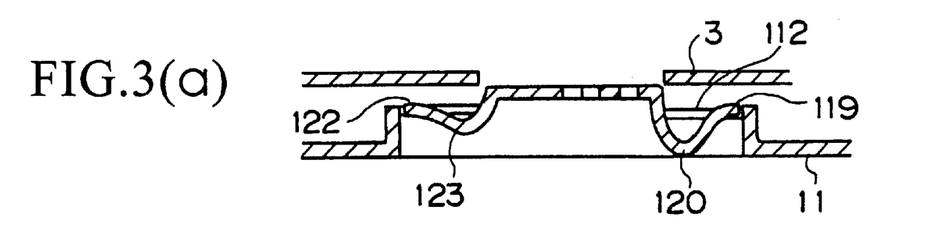
Figure 3B:
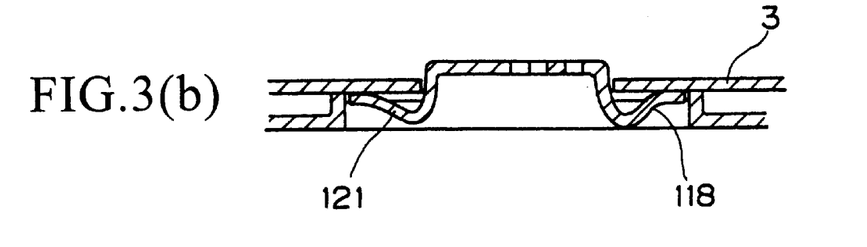
Figure 3C:
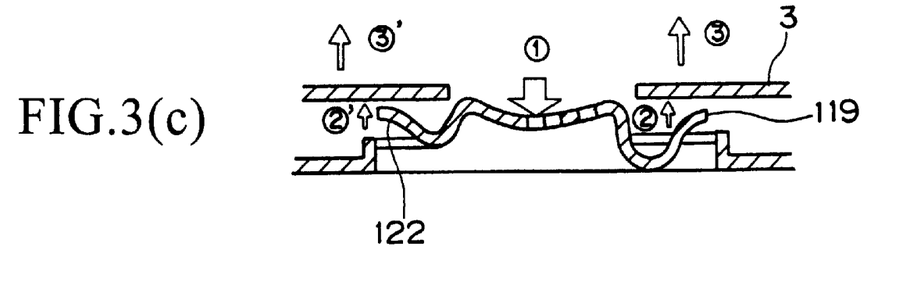

The end of the tongue-shaped 118 on the side of the disk-receiving member 112 extends, as shown in FIG. 3(a), to below the disk-receiving member 112, having a bent section 120 which may or may not come into contact with the base member 11, the nail-shape member 119 as its front end being slightly above the upper face of the disk-receiving member 112.

The end of the tongue-shaped 121 on the side of the disk-receiving member 112 extends, as shown in FIG. 3(a), to below the disk-receiving member 112, having a bent section 123 which does not come into contact with the base member 11, the nail-shape member 122 as its front end being slightly above the upper face of the disk-receiving member 112. Moreover, the tongue-shaped member 121 is connected to the adjacent wall as part of the cylindrical wall via a member 124 which is on the essential circle and functions as the support axis for rising the nail-shaped member 122 at the front end when the cylindrical member 113 is pushed downward.

A cantilever arm 125 is positioned in the essentially circular hole on the upper face of the cylindrical body, projecting in the direction of the tongue-shaped member extension, and moving on the support axis 124 by a rotational force provided by the tongue-shaped member 121.

The compact disk 3 is set in the disk-holding apparatus 100 by fitting the central hole 31 of the compact disk 3 into the cylindrical body 113 until it comes into contact with the disk-receiving member 112.

The mechanism for setting the compact disk in the apparatus of the present invention depends on elastic deformation of the upper periphery of the cylindrical body 113, easily caused when the cylindrical body 113 is pushed downward, which contracts it sufficiently to allow the central hole 31 to pass over the cylindrical body 113. Thus, the compact disk 3 is securely held by the main body of the disk-holding apparatus 100. In this case, the tongue-shaped members 118 and 121 are elastically deformed, bringing the nail-shaped members 119 and 122 into contact with the compact disk 3 to push it upward, as shown in FIG. 3(b). When the compact disk 3 is released from the disk-holding apparatus 100, the upper face of the cylindrical body 113 is pushed downward by a finger, (1) shown in FIG. 3(c), which easily deforms elastically the upper periphery of the cylindrical body 113, contracting it sufficiently to allow the central hole 31 to pass over the cylindrical body 113. When the compact disk 3 is released from the constraint of the cylindrical body 113, the elastically deformed nail-shaped member 119 jumps up, and the depressed tongue-shaped member 118 accelerates the upward motion of the nail-shaped member 119 by the leverage at the bent section 120, (2) shown in FIG. 3(c), to immediately push the compact disk 3 upward, (3) shown in FIG. 3(c), easily releasing it from the cylindrical body 113. Moreover, when the upper face of the cylindrical body 113 is pushed downward, (1) shown in FIG. 3(c), a force is applied to the tongue-shaped member 121 to move on the support axis 124 as the axis, causing the nail-shaped member 122 at its front end to jump up, (2)' shown in FIG. 3(c), and immediately pushing the compact disk 3 upward, (3)' shown in FIG. 3(c). As a result, the compact disk 3 can be easily released from the tray body 1 by one hand.

The front end of the tongue-shaped member 118 jumps up, when the cylindrical body 113 is pushed downward, by the leverage on the bent section 120, functioning to push the compact disk 3 upward, as described above. The tongue-shaped member 121, on the other hand, is caused to move on the support axis 121 as the axis, when the cylindrical body 113 is pushed downward, and its front end 122 functions to push the compact disk 3 upward. As a result, the compact disk can be easily released by one hand even out of a monolithic, thin jewel case which has no base member.

Example 2

Figure 4:
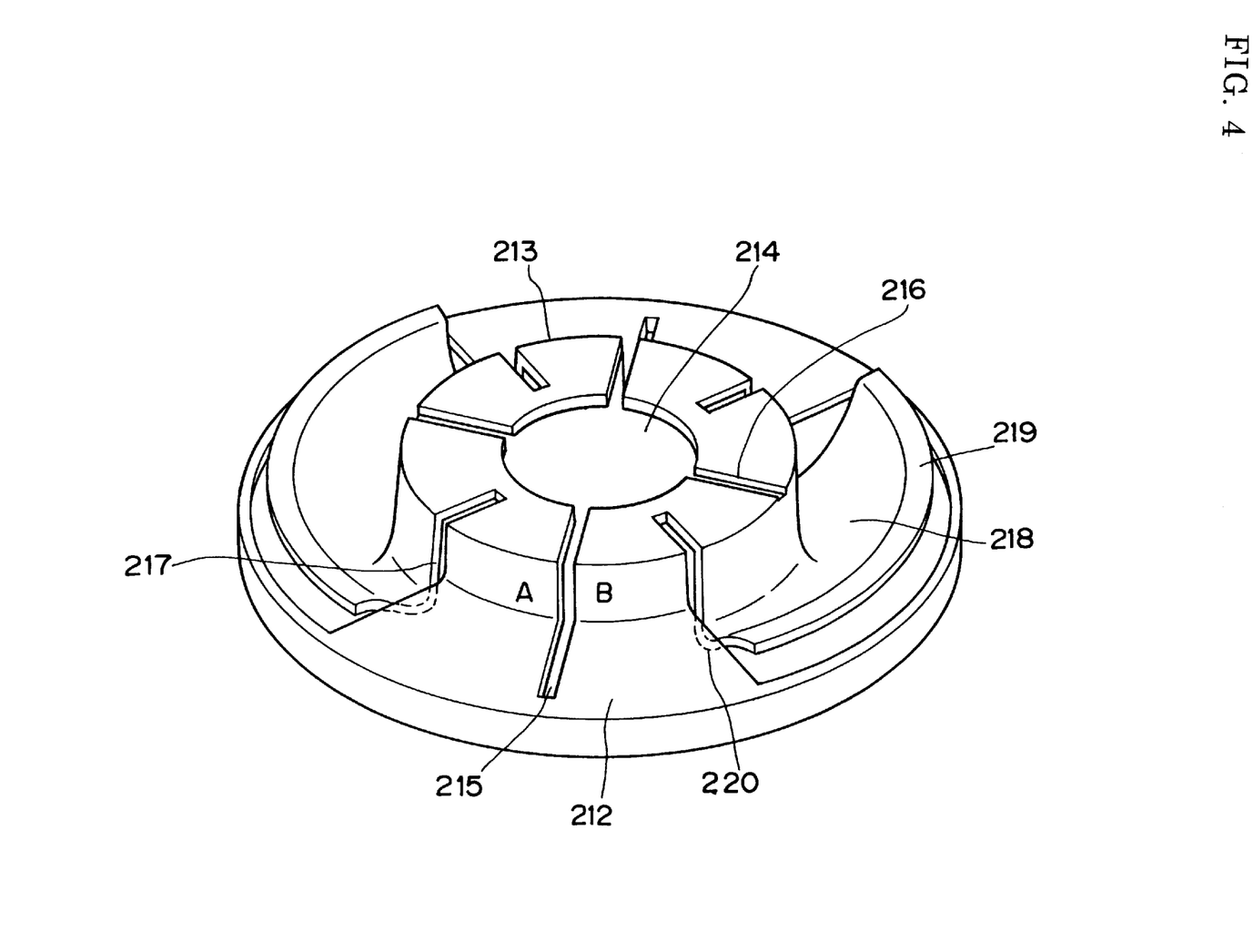
FIG. 4 is a oblique view of another embodiment of the apparatus of the present invention for holding a compact disk.
Figure 5:
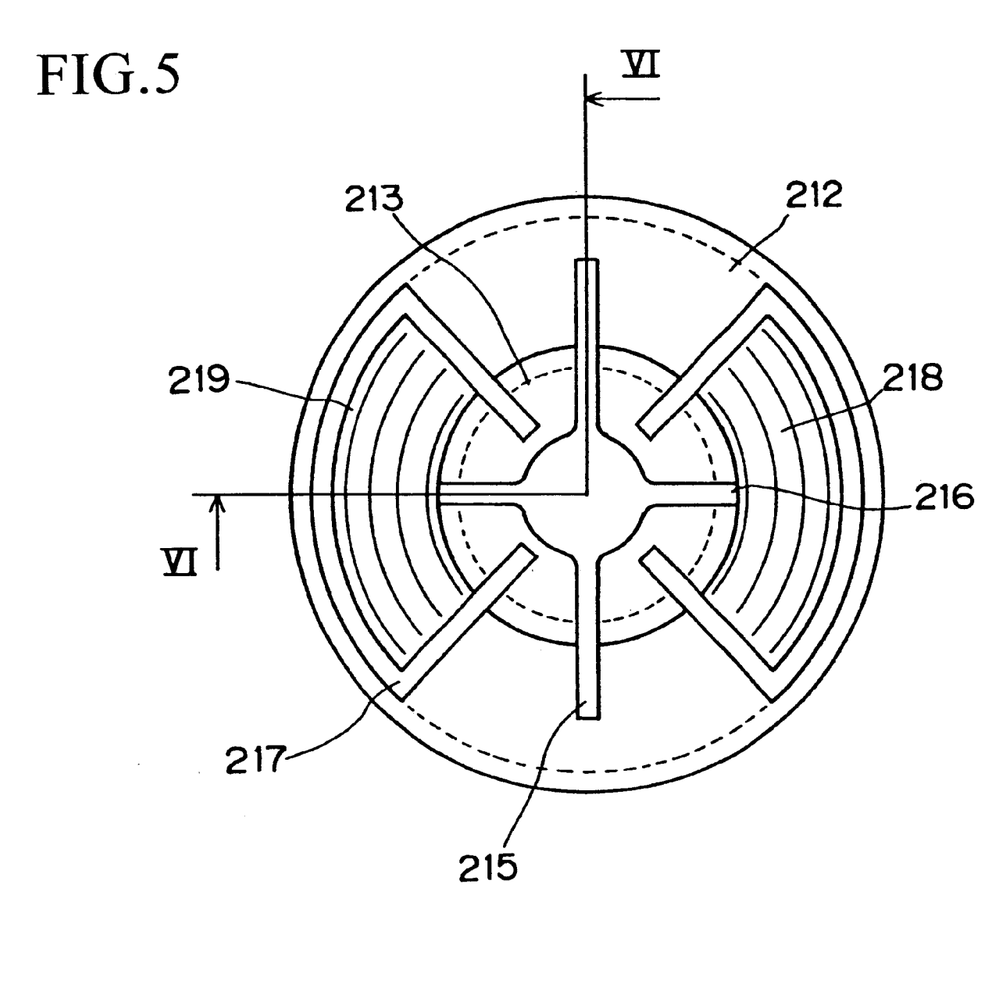
FIG. 5 is the plan view of the apparatus shown in FIG. 4.
Figure 6A:
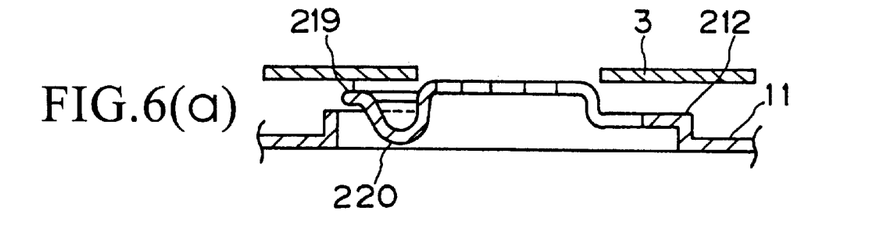
Figure 6B:
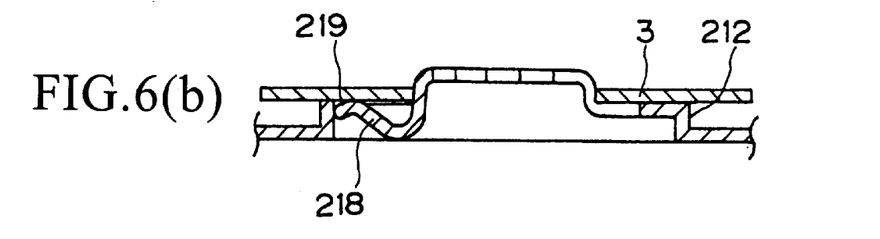
Figure 6C:
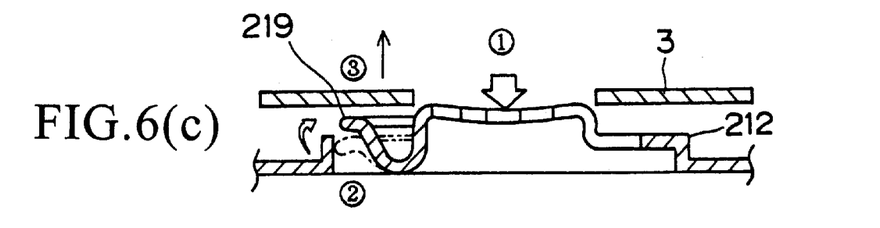

FIG. 4 is an oblique view of the cylindrical body, positioned at the center of the base for the compact disk tray of the present invention. It is composed of a disk-receiving member which holds the compact disk, and disk-holding member into which the central hole of the disk is fit. FIG. 5 is the plan view of FIG. 4, and FIG. 6 presents the cross-sectional views of the VI—VI section shown in FIG. 5, where (a) the cross-sectional view with the compact disk not set, (b) the one with the compact disk set, and (c) the one for describing the mechanism of releasing the compact disk.

Referring to FIG. 4, the compact disk tray 1 of the present invention has a disk-receiving member 212 and cylindrical body 213, around which the central hole 31 of the compact disk is fit, at the center of the disk-receiving member 212, the cylindrical body 213 comprising two semi-cylindrical bodies A and B, divided by a cut opening 215 in such a way to have a circular hole 214 at the center of the upper face of the cylindrical body 213. These semi-cylindrical bodies A and B stand essentially upright from the face of the disk-receiving member 212 to form the cylindrical body 213 having an essentially circular upper face with a slightly larger diameter than that of the central hole 31 of the compact disk. Moreover, the upper face of each of the semi-cylindrical bodies A and B is divided into 2 or more sections, to be easily deformed elastically inward in the presence of the cut opening 216, when it is pushed downward.

Each of the semi-cylindrical bodies A and B forms, between the cut openings 217, a tongue-shaped member 218 with a nail-shaped member 219 at the front end, which extends to the disk-receiving member 212.

The end of the tongue-shaped 218 on the side of the disk-receiving member 212 extends, as shown in FIG. 6, to below the disk-receiving member 112, having a bent section 220 which may or may not come into contact with the base member 11, the nail-shape member 219 as its front end being slightly above the upper face of the disk-receiving member 212.

The compact disk 3 is set in the tray 1 by fitting the central hole 31 of the compact disk 3 into the cylindrical body 213 until it comes into contact with the disk-receiving member 212.

The mechanism for setting the compact disk in the tray depends on elastic deformation of the upper periphery of the cylindrical body 213, easily caused in the presence of the notches 215 and 216 when the cylindrical body 213 is pushed downward, which contracts it sufficiently to allow the central hole 31 to pass over the cylindrical body 213. Thus, the compact disk 3 is securely held by the cylindrical body 213. In this case, the tongue-shaped member 218 is elastically deformed, bringing the nail-shaped member 219 into contact with the compact disk 3 to push it upward, as shown in FIG. 6(b).

When the compact disk 3 is released from the tray 1, the upper face of the cylindrical body 213 is pushed downward by a finger, (1) shown in FIG. 6(c), which easily deforms elastically the upper periphery of the cylindrical body 213 in the presence of the notches 215 and 216, contracting it sufficiently to allow the central hole 31 to pass over the cylindrical body 213. When the compact disk 3 is released from the constraint of the cylindrical body 213, the elastically deformed nail-shaped member 219 jumps up, and the depressed tongue-shaped member 218 accelerates the upward motion of the nail-shaped member 219 by the leverage at the bent section 220, (2) shown in FIG. 6(c), to immediately push the compact disk 3 upward, (3) shown in FIG. 6(c), easily releasing the compact disk 3 from the cylindrical body 213. As a result, the compact disk 3 can be easily released from the tray body by one hand.

Example 3

Figure 7:
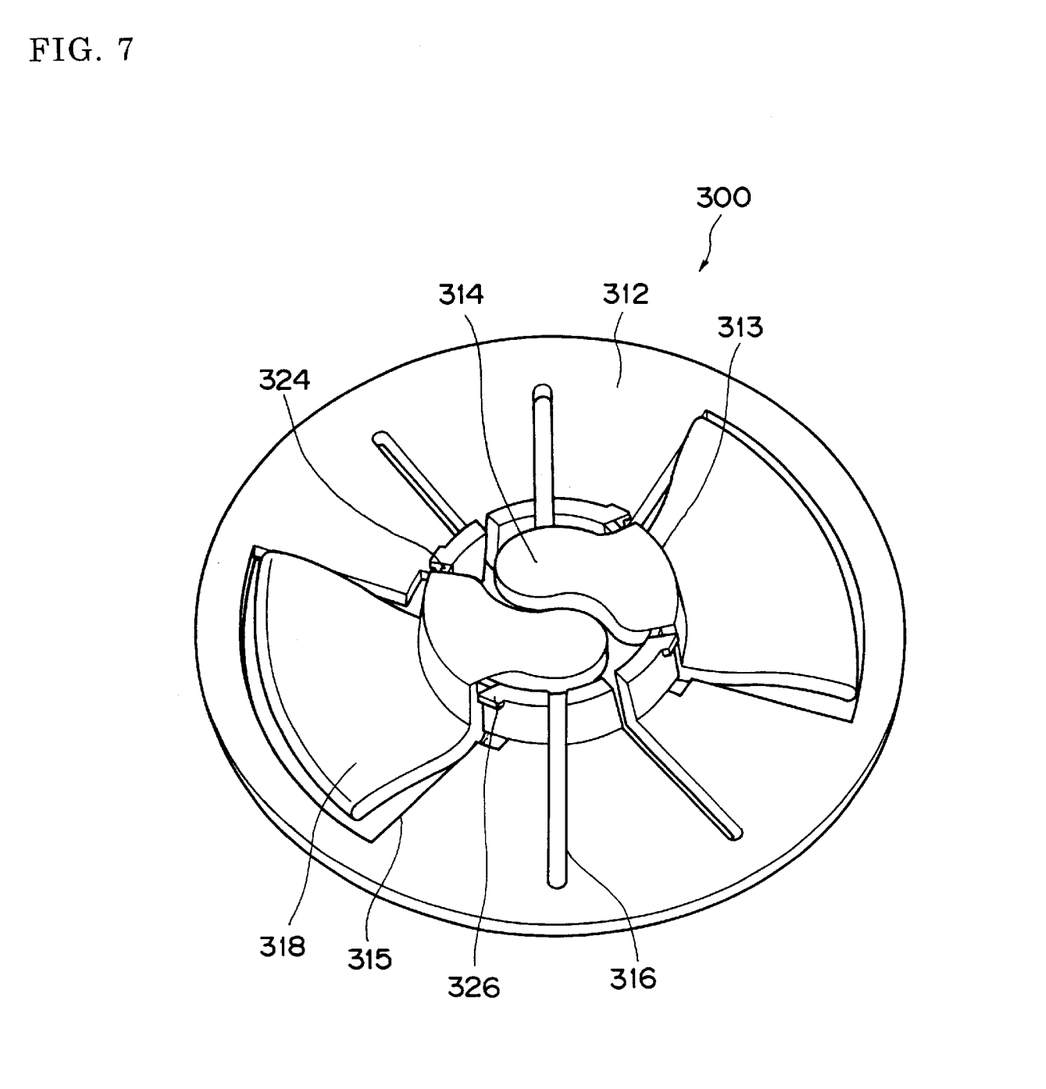
FIG. 7 is an oblique view of one embodiment of the apparatus of the present invention for holding a compact disk.
Figure 8:
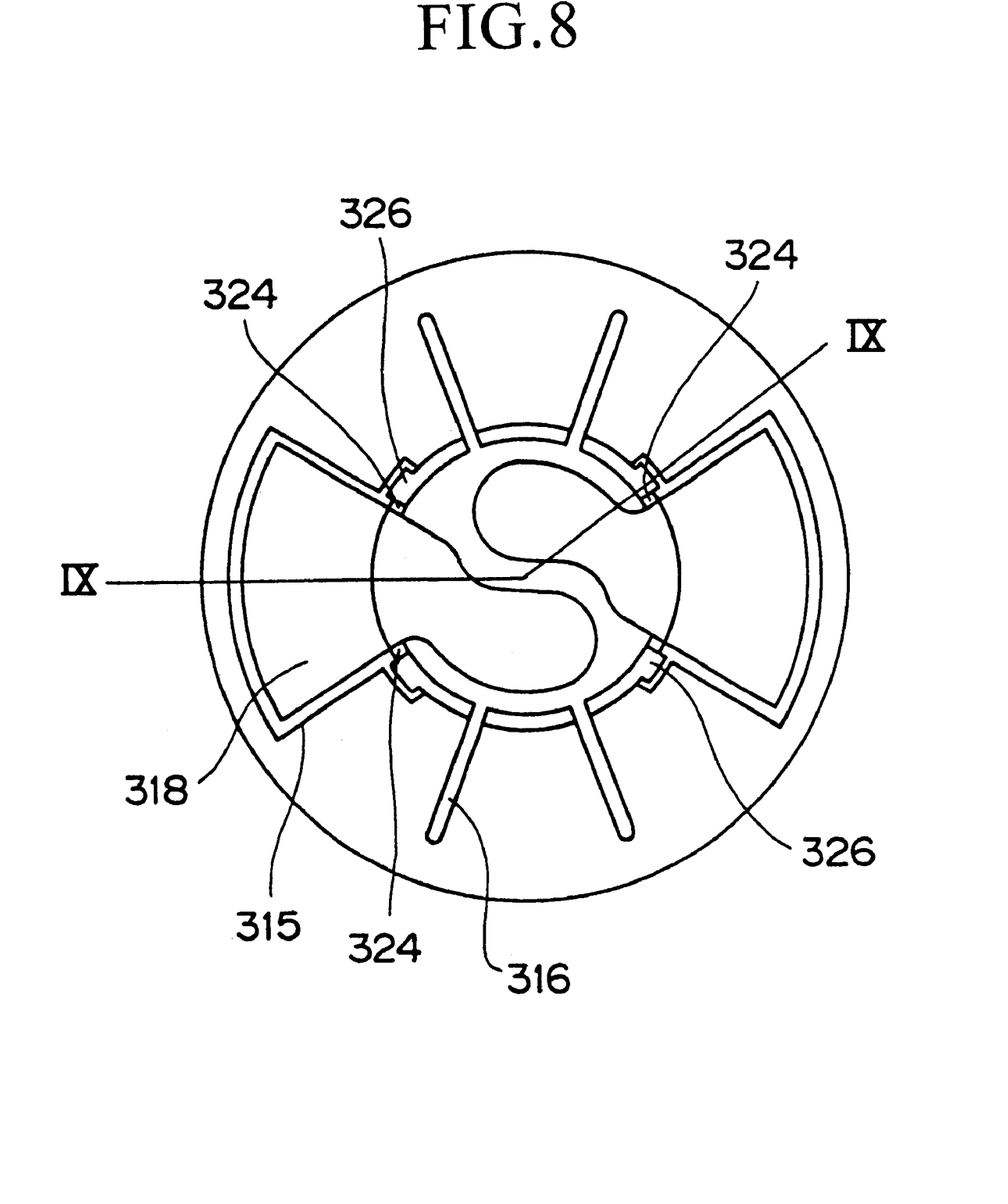
FIG. 8 is the plan view of the apparatus shown in FIG. 1.

FIG. 7 is an oblique view of the apparatus of the present invention for holding a compact disk, composed of a cylindrical body around which the central hole of the compact disk is fit, and disk-receiving member. FIG. 8 is the plan view of the apparatus shown in FIG. 7, and FIG. 9 presents the cross-sectional views of the IX—IX section of the apparatus shown in FIG. 8, where (a) the cross-sectional view with the compact disk not set, (b) the one with the compact disk set, and (c) the one for describing the mechanism of releasing the compact disk.

Referring to FIG. 7, the apparatus 300 for holding a compact disk has a disk-receiving member 312 and cylindrical body 313, around which the central hole 31 of the compact disk is fit, at the center of the disk-receiving member 312, the cylindrical body 313 standing essentially upright from the face of the disk-receiving member 312, where the upper face of the cylindrical body 313 has a slightly smaller diameter than the central hole 31 of the compact disk.

The upper face of the cylindrical body 313 is provided with helping reduce diameter of the upper face when it is pushed downward. The apparatus is also provided with a plurality of tongue-shaped members 318 extending between cut openings 315 from the cylindrical body 313 to the disk-receiving member 312, each tongue-shaped member 318 having a nail-shaped member 322 at the front end. The tongue-shaped member 318 is connected to the adjacent wall as part of the cylindrical body periphery via a support axis 124. And, another wall is divided by cut opening 316 in order to fit the central hole of the compact disk. And then, a plurality of projections 326 are formed on the cylindrical body periphery to press the compact disk to the disk-receiving member 312.

Figure 9A:
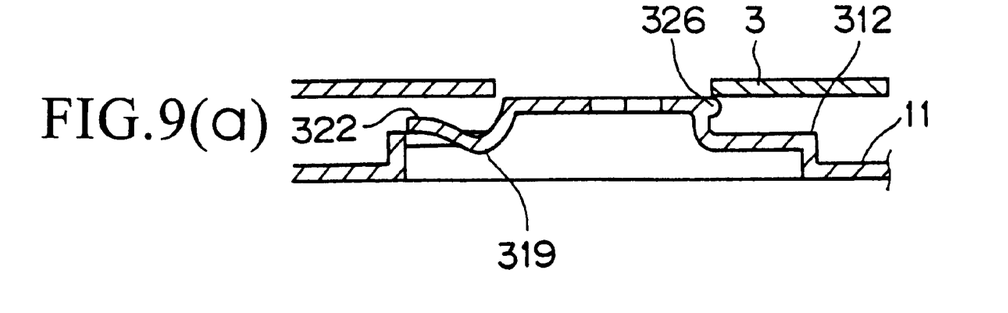
Figure 9B:
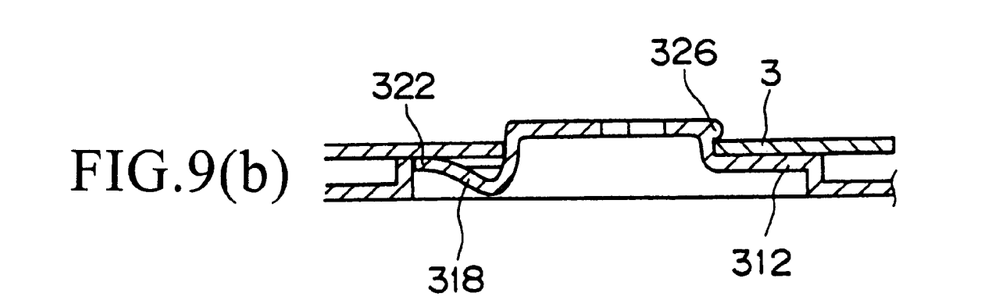
Figure 9C:
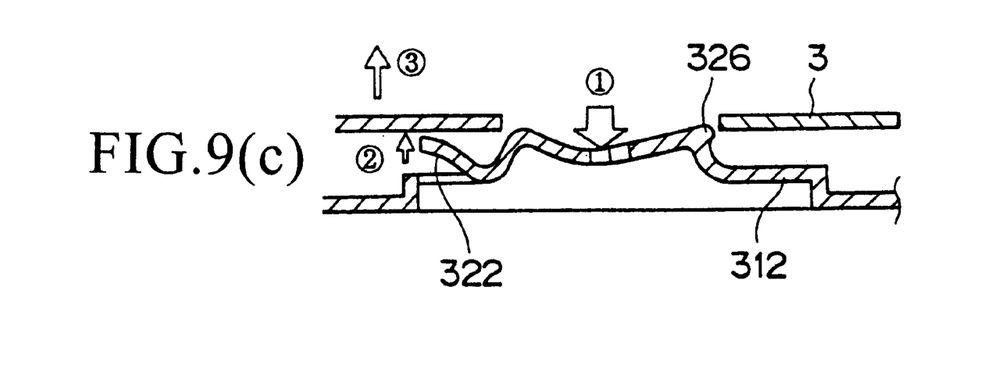

The end of the tongue-shaped 318 on the side of the disk-receiving member 312 extends, as shown in FIG. 9(a), to below the disk-receiving member 312, having a bent section 319 which does not come into contact with the base member 11, the nail-shape member 322 as its front end being slightly above the upper face of the disk-receiving member 312. Moreover, the tongue-shaped member 318 is connected to the adjacent wall as part of the cylindrical wall via a member 324 which is on the essential circle and functions as the support axis for rising the nail-shaped member 322 at the front end when the cylindrical member 313 is pushed downward.

A cantilever arm 314 is positioned in the essentially circular hole on the upper face of the cylindrical body, projecting in the direction of the tongue-shaped member extension, and moving on the support axis 324 by a rotational force provided by the tongue-shaped member 318.

The compact disk 3 is set in the disk-holding apparatus 300 by fitting the central hole 31 of the compact disk 3 into the cylindrical body 313 until it comes into contact with the disk-receiving member 312.

The mechanism for setting the compact disk in the apparatus of the present invention depends on elastic deformation of the upper periphery of the cylindrical body 313, easily caused when the cylindrical body 313 is pushed downward, which contracts it sufficiently to allow the central hole 31 to pass over the cylindrical body 313. Thus, the compact disk 3 is securely held by the main body of the disk-holding apparatus 300. In this case, the tongue-shaped members 318 are elastically deformed, bringing the nail-shaped members 322 into contact with the compact disk 3 to push it upward, as shown in FIG. 9(b), and the projections 326 hold the compact disk 3.

When the compact disk 3 is released from the disk-holding apparatus 300, the upper face of the cylindrical body 313 is pushed downward by a finger, (1) shown in FIG. 9(c), which easily deforms elastically the upper periphery of the cylindrical body 313 having the projections 326 on the cylindrical body periphery, contracting it sufficiently to allow the central hole 31 to pass over the cylindrical body 313. When the compact disk 3 is released from the constraint by the projections 326, a force is applied to the tongue-shaped member 318 to move on the support axis 324 as the axis, causing the nail-shaped member 322 at its front end to jump up, (2) shown in FIG. 9(c), and immediately pushing the compact disk 3 upward, (3) shown in FIG. 9(c). As a result, the compact disk 3 can be easily released from the tray body 1 by one hand.

The tongue-shaped member 318 is caused to move on the support axis 324 as the axis, when the cylindrical body 313 is pushed downward, and its front end 322 functions to push the compact disk 3 upward. As a result, the compact disk can be easily released by one hand even out of a monolithic, thin jewel case which has no base member.

The apparatus of the present invention for holding a compact disk holds a compact disk securely, like the conventional one, and is provided with a function of releasing the compact disk it holds by the principle(s) of rotation and/or leverage, allowing a user to easily release the disk by one hand pushing the release mechanism, irrespective of age and sex. It is of a monolithic structure, needing no additional accessory, and can be produced at higher productivity, because of improved mold life and molding cycle characteristics it provides.

What is claimed is:

1. An apparatus for holding a compact disk having a center hole, comprising:

a disk-receiving member for receiving the compact disk;

a cylindrical body formed on said disk-receiving member for being fitted into said center hole of said compact disk; and an upper surface member having a plurality of bent members extending radially from the upper surface member, each of said bent members being provided at an end portion with a curved top;

a pair of support axes for connecting one of the bent members to the cylindrical body, the support axes supporting the one of the bent members such that, when said upper surface member is pushed down, the end portion of the one of the bent members rises pushing up the compact disk on the disk-receiving member.

2. An apparatus for holding a compact disk of claim 1, wherein the end portion of each of the bent members rises by the principle of leverage causing a lower portion of the bent members to function as a fulcrum to lift the compact disk.

3. An apparatus for holding a compact disk of claim 1, wherein each of the bent members has the support axes connected to the cylindrical body such that the bent members rise causing the support axes to function as a fulcrum to lift the compact disk.

4. An apparatus for holding a compact disk of claim 1, wherein the cylindrical body and the bent members are integrally formed, at least one of the bent members rises by the principle of leverage causing a lower portion of the bent members to function as a fulcrum, and at least another one of the bent members has the support axes connected to the cylindrical body and the another one of the bent members moves causing the supporting member to function as a fulcrum, to lift the compact disk.

5. An apparatus for holding a compact disk of claim 1 or 4, wherein said cylindrical body has an essentially circular hole at the center of the upper face, wherein at least one of the bent members has the support axes connected to the cylindrical body and each of the bent members rises causing the support axes to function as a fulcrum to lift the compact disk, wherein at least one other end portion of each of the bent members rises by the principle of leverage causing a lower portion of the bent members to function as a fulcrum to lift the compact disk, and wherein each of the bent members also has a cantilever arm in said essentially circular hole on the upper face of said cylindrical body.

6. An apparatus for holding a compact disk of claim 1 or 2, wherein said cylindrical body, in the disk-holding member at the center of the compact disk tray is composed of two semi-cylindrical bodies forming said cylindrical body having a circular hole at the center of the upper face, each of the semi-cylindrical bodies forming a bent member.

* * * * *